(12) United States Patent
Barrett et al.

(10) Patent No.: US 7,562,375 B2
(45) Date of Patent: Jul. 14, 2009

(54) FAST CHANNEL CHANGE

(75) Inventors: Peter T. Barrett, San Francisco, CA (US); James Armand Baldwin, Redwood City, CA (US); Dustin L. Green, Redwood, CA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 10/684,138

(22) Filed: Oct. 10, 2003

(65) Prior Publication Data

US 2005/0081244 A1 Apr. 14, 2005

(51) Int. Cl.
 *G06F 13/00* (2006.01)
 *H04N 7/173* (2006.01)
 *H04N 5/268* (2006.01)

(52) U.S. Cl. .................. 725/38; 348/725; 348/705; 725/105; 725/116; 725/86; 725/90

(58) Field of Classification Search ................ None
See application file for complete search history.

(56) References Cited

U.S. PATENT DOCUMENTS

| | | | |
|---|---|---|---|
| 5,461,415 A | 10/1995 | Wolf et al. | |
| 5,473,362 A | 12/1995 | Fitzgerald et al. | |
| 5,583,868 A | 12/1996 | Rashid et al. | |
| 5,631,694 A | 5/1997 | Aggarwal et al. | |
| 5,699,362 A | 12/1997 | Makam | |
| 5,724,646 A | 3/1998 | Ganek et al. | |
| 5,732,217 A * | 3/1998 | Emura .................. | 725/90 |
| 5,822,537 A | 10/1998 | Katseff et al. | |
| 5,884,141 A | 3/1999 | Inoue et al. | |
| 5,892,915 A * | 4/1999 | Duso et al. .................. | 709/219 |
| 5,926,230 A | 7/1999 | Niijima et al. | |
| 5,936,659 A | 8/1999 | Viswanathan et al. | |
| 5,963,202 A | 10/1999 | Polish | |
| 6,047,317 A | 4/2000 | Bisdikian et al. | |
| 6,078,594 A | 6/2000 | Anderson et al. | |
| 6,118,498 A * | 9/2000 | Reitmeier .................. | 348/725 |
| 6,138,147 A | 10/2000 | Weaver et al. | |

(Continued)

FOREIGN PATENT DOCUMENTS

CA 2480461 10/2003

(Continued)

OTHER PUBLICATIONS

Murphy, "Overview Of MPEG", retrieved on Mar. 29, 2007, at <<http://web.archive.org/web/20001203031200/http://www.eeng.dcu.ie/~murphyj/the/no...>>, pp. 1-3.

(Continued)

*Primary Examiner*—Vivek Srivastava
*Assistant Examiner*—Jun Fei Zhong

(57) ABSTRACT

In an exemplary server implementation, a server is configured to retain at least one independent frame for each video channel of multiple video channels that are being distributed using multicast communications and is adapted to respond to channel change requests from clients by transmitting the retained at least one independent frame of a requested video channel to a requesting client using a unicast communication. In an exemplary method implementation, a method for fast channel changing in a multicast video distribution architecture includes: detecting a channel change request that indicates a requested channel, the requested channel corresponding to a multicast group; and transmitting a retained intra frame for the requested channel as a unicast communication.

5 Claims, 6 Drawing Sheets

U.S. PATENT DOCUMENTS

| | | | |
|---|---|---|---|
| 6,222,482 | B1 | 4/2001 | Gueziec |
| 6,222,886 | B1 | 4/2001 | Yogeshwar |
| 6,266,817 | B1 | 7/2001 | Chaddha |
| 6,330,286 | B1 | 12/2001 | Lyons et al. |
| 6,418,473 | B1 | 7/2002 | St. Maurice et al. |
| 6,430,547 | B1 | 8/2002 | Busche et al. |
| 6,496,814 | B1 | 12/2002 | Busche |
| 6,505,106 | B1 | 1/2003 | Lawrence et al. |
| 6,564,262 | B1 | 5/2003 | Chaddha |
| 6,580,754 | B1 | 6/2003 | Wan et al. |
| 6,609,149 | B1 | 8/2003 | Bandera et al. |
| 6,615,133 | B2 | 9/2003 | Moskowitz et al. |
| 6,637,031 | B1 | 10/2003 | Chou |
| 6,721,952 | B1 | 4/2004 | Guedalia et al. |
| 6,728,965 | B1* | 4/2004 | Mao ............................ 725/38 |
| 6,738,980 | B2* | 5/2004 | Lin et al. ...................... 725/88 |
| 6,751,129 | B1 | 6/2004 | Gongwer |
| 6,751,626 | B2 | 6/2004 | Brown et al. |
| 6,766,245 | B2 | 7/2004 | Padmanabhan |
| 6,837,031 | B1 | 1/2005 | Hannen et al. |
| 6,842,724 | B1 | 1/2005 | Lou et al. |
| 6,856,759 | B1 | 2/2005 | Fukuda et al. |
| 6,973,667 | B2* | 12/2005 | Fritsch ........................ 725/88 |
| 7,051,170 | B2 | 5/2006 | Guo |
| 7,106,749 | B1 | 9/2006 | Darshan et al. |
| 7,158,531 | B2 | 1/2007 | Barton |
| 7,167,488 | B2 | 1/2007 | Taylor et al. |
| 7,334,044 | B1 | 2/2008 | Allen |
| 7,382,796 | B2 | 6/2008 | Haberman et al. |
| 7,430,222 | B2* | 9/2008 | Green et al. ................. 370/486 |
| 2002/0002708 | A1 | 1/2002 | Arye |
| 2002/0024956 | A1 | 2/2002 | Keller-Tuberg |
| 2002/0031144 | A1 | 3/2002 | Barton |
| 2002/0040481 | A1 | 4/2002 | Okada et al. |
| 2002/0107968 | A1 | 8/2002 | Horn et al. |
| 2002/0108119 | A1 | 8/2002 | Mao et al. |
| 2002/0114331 | A1 | 8/2002 | Cheung et al. |
| 2002/0124258 | A1 | 9/2002 | Fritsch |
| 2002/0144276 | A1 | 10/2002 | Radford et al. |
| 2002/0147979 | A1 | 10/2002 | Corson |
| 2002/0147991 | A1 | 10/2002 | Furlan et al. |
| 2002/0170067 | A1 | 11/2002 | Norstrom et al. |
| 2003/0037331 | A1 | 2/2003 | Lee |
| 2003/0060196 | A1 | 3/2003 | Levinberg |
| 2003/0093801 | A1 | 5/2003 | Lin et al. |
| 2003/0106053 | A1 | 6/2003 | Sih et al. |
| 2003/0158899 | A1 | 8/2003 | Hughes |
| 2003/0159143 | A1 | 8/2003 | Chan |
| 2003/0202594 | A1 | 10/2003 | Lainema |
| 2003/0202775 | A1 | 10/2003 | Junkersfeld et al. |
| 2004/0003399 | A1* | 1/2004 | Cooper ........................ 725/38 |
| 2004/0034863 | A1* | 2/2004 | Barrett et al. ................. 725/38 |
| 2004/0034864 | A1 | 2/2004 | Barrett et al. |
| 2004/0049793 | A1 | 3/2004 | Chou |
| 2004/0128694 | A1 | 7/2004 | Bantz et al. |
| 2004/0160971 | A1 | 8/2004 | Krause et al. |
| 2004/0160974 | A1 | 8/2004 | Read et al. |
| 2004/0255328 | A1* | 12/2004 | Baldwin et al. .............. 725/90 |
| 2005/0039214 | A1 | 2/2005 | Lorenz et al. |
| 2005/0071496 | A1 | 3/2005 | Singal et al. |
| 2005/0078680 | A1 | 4/2005 | Barrett et al. |
| 2005/0078757 | A1 | 4/2005 | Nohrden |
| 2005/0080904 | A1 | 4/2005 | Green |
| 2005/0081243 | A1 | 4/2005 | Barrett et al. |
| 2005/0081244 | A1 | 4/2005 | Barrett et al. |
| 2005/0081246 | A1 | 4/2005 | Barrett et al. |
| 2005/0128951 | A1 | 6/2005 | Chawla et al. |
| 2005/0154917 | A1 | 7/2005 | deCarmo |
| 2005/0172314 | A1 | 8/2005 | Krakora et al. |
| 2005/0190781 | A1 | 9/2005 | Green et al. |
| 2005/0240961 | A1* | 10/2005 | Jerding et al. ................ 725/37 |
| 2006/0020995 | A1* | 1/2006 | Opie et al. ................... 725/117 |
| 2006/0117343 | A1 | 6/2006 | Novak et al. |
| 2006/0117358 | A1 | 6/2006 | Baldwin et al. |
| 2006/0117359 | A1 | 6/2006 | Baldwin et al. |
| 2006/0251082 | A1 | 11/2006 | Grossman et al. |
| 2007/0113261 | A1 | 5/2007 | Roman et al. |

FOREIGN PATENT DOCUMENTS

| | | |
|---|---|---|
| EP | 0633694 | 1/1995 |
| EP | 1294193 | 3/2003 |
| WO | WO9806045 | 2/1998 |
| WO | WO9909741 | 2/1999 |
| WO | WO 01/03373 A1 | 1/2001 |
| WO | WO0126271 | 4/2001 |
| WO | WO0156285 | 8/2001 |
| WO | WO02087235 | 10/2002 |
| WO | WO03088646 | 10/2003 |
| WO | WO2004062291 | 7/2004 |

OTHER PUBLICATIONS

U.S. Appl. No. 11/010,200, Smith, et al., filed Dec. 10, 2004.

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "EigenGait: Motion-based Recognition of People Using Image Self-similarity," Proc. Intl. on Audio and Video-based Person Authentication (AVBPA), 2001, 11 pages.

BenAbdelkader, et al., "Motion-based Recognition of People in Eigengait Space," 5th International Conference on Automatic Face and Gesture Recognition, May 20, 2002, pp. 1-6.

BenAbdelkader, et al., "Person Identification Using Automatic Height and Stride Estimation," IEEE International Conference on Pattern Recognition, Aug. 11-15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition," Workshop on Biometric Authenticaiton (BIOMET), in association with ECCV 2002, Jun. 1, 2002, 12 pages.

Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

"Digital Headend Solutions; Tune in to Digital TV", available at <<http://www.tutsystems.com/digitalheadend/solutions/index.ctm>>, accessed on Nov. 3, 2005, 1 page.

Ding, et al., "Resource-Based Striping: An Efficient Striping Strategy for Video Servers Using Heterogeneous Disk-Subsystems", Multimedia Tools and Applications, vol. 19, No. 1, Jan. 2003, pp. 29-51.

Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.

Gil, et al., "Simulation of a Mobility Prediction Scheme Based on Neuro-Fuzzy Theory in Mobile Computing", Simulation, Jul. 2000, vol. 75, No. 1, pp. 6-17.

Gonzalez, et al., "Load Sharing Based on Popularity in Distributed Video on Demand Systems", Proceedings 2002 IEEE Int'l. Conf. on Multimedia and Expo, vol. 1, Aug. 2002, pp. 5-8.

Halvorsen et al., "Q-L/MRP: A Buffer Muffer Management Mechanism for QoS Support in a Multimedia DBMS", IEEE 1998, pp. 162-171.

Haritaoglu, et al., "W4S: A Real-Time System for Detecting and Tracking People in 2 1/2 D," in European Conference on Computer Vision, 1998, 16 pages.

Hurst, et al., "MPEG Splicing: A New Standard for Television-SMPTE 312M", SMPTE Journal, Nov. 1998, pp. 978-988.

"Infovalue Experts; Info Value Unveils Industry's First Video Multicasting Solution with Instant Replay", available at <<http://www.infovalue.com/links/news%20room/press%20releases/1999/

Press_%20First_Multicasting_with _Instant_Replay.pdf>>, accessed on Nov. 3, 2005, 3 pages.

Kamiyama et al., "Renegotiated CBR Transmission in Interactive Video-on-Demand System", IEEE 1997, pp. 12-19.

Lee, "Staggered Push-A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002, Lecture Notes in Computer Science, vol. 2532, Dec. 2002, pp. 295-302.

Lu, et al., "Experience in designing a TCP/IP based VOD system over a dedicated network", IEEE 1997, pp. 262-266.

"MediaFLO: Introducing FLO Technology", available at <<http://www.qualcomm.com/mediaflo/news/pdf/flo_whitepaper.pdf>>, accessed on Nov. 3, 2005, pp. 1-8.

"Multidimensional Database Technology", Computer, Dec. 2001, vol. 34, No. 12, pp. 40-46.

"Optibase MGW 2400", available at <<http://www.epecomgraphics.com/optibase_mgw2400_features.html>>, accessed on Nov. 3, 2005, 2 pages.

Petit, et al., "Bandwidth Resource Optimization in Video-On-Demand Network Architectures", IEEE 1994, pp. 91-97.

"QuickTime Streaming your Media in Real Time", available at <<http://www.apple.com.tw/quicktime/technologies/streaming/>>, accessed on Nov. 3, 2005, 3 pages.

Song, et al., "Replica Striping for Multi-Resolution Video Servers", IDMS/PROMS 2002, Lecture Notes in Computer Science, vol. 2515, No. 2002, pp. 300-312.

Tsai, R., "An Efficient and Accurate Camera Calibration Technique for 3d Machine Vision," Proceedings of the Computer Vision and Pattern Recognition, 1986, pp. 364-374.

Turk, et al., "Face Recognition Using Elgenfaces," CVPR, 1991, pp. 586-591.

Wee, et al., "Splicing MPEG Video Streams in the Compressed Domain", IEEE 1997, pp. 224-230.

Wolfson, et al., "Modeling Moving Objects for Location Based Servies", Lectures Notes in Computer Science, 2002, vol. 2538, pp. 46-58.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Cost Model of Moving Objects Communication with GPS", International Conference on Communications, Circuits and Systems and West Sino Exposition Proceedings, 2002, vol. 2, pp. 1576-1580.

"Active Network based management for QoS assured multicast delivered media", State et al., Joint 4th IEEE Int'l Conf. on ATM and High Speed Intelligent Internet Symposium; Apr. 2001; pp. 123-127.

"On-line Scene Change Detection of Multicast (MBone) Video", Zhou et al., Proceedings of the SPIE—The International Society for Optical Engineering, Nov. 1998, vol. 3527, pp. 271-282.

"Group Communication in Multichannel Networks with Staircase Interconnection Topologies", McKinley et al., Computer Communication Review, ACM, Sep. 1989, vol. 19, No. 4, pp. 170-181.

"Scalable Video Coding and Transport over Broad-Band Wireless Networks", Wu et al., Proceedings of the IEEE, Jan. 2001, vol. 89, No. 1, pp. 6-20.

"Support for Multicast over UNI 3.0/3.1 based ATM Networks", G. Armitage, RFC 2022, Standards Track, Nov. 1996, pp. 1-82.

U.S. Appl. No. 10/218,674; Barrett, et al., filed Aug. 13, 2002.

Non Final Office Action for U.S. Appl. No. 10/218,674, Dated Jan. 9, 2007.

Non Final Office Action for U.S. Appl. No. 10/218,674, Dated Oct. 10, 2007.

Final Office Action for U.S. Appl. No. 10/218,674, Dated Apr. 14, 2008.

U.S. Appl. No. 10/798,993, Barrett, et al., filed Mar. 12, 2004.

Non-Final Office Action Received for U.S. Appl. No. 10/798,993, Dated Jul. 8, 2008.

U.S. Appl. No. 10/800,287, Barrett, et al., filed Mar. 12, 2004.

Non Final Office Action Received for U.S. Appl. No. 10/800,287, Dated Oct. 3, 2007.

Final Office Action Received for U.S. Appl. No. 10/800,287, Dated Mar. 18, 2008.

U.S. Appl. No. 10/800,309, Barrett, et al., filed Mar. 12, 2004.

Non Final Office Action Received for U.S. Appl. No. 10/800,309, Dated Oct. 5, 2007.

Non Final Office Action Received for U.S. Appl. No. 10/800,309, Dated Apr. 4, 2008.

U.S. Appl. No. 10/218,675; Barrett, et al., filed Aug. 13, 2002.

Non Final Office Action for U.S. Appl. No. 10/218,675, Dated May 8, 2007.

Non Final Office Action for U.S. Appl. No. 10/218,675 Dated Jan. 24, 2008.

Final Office Action for U.S. Appl. No. 10/218,675 Dated Sep. 4, 2008.

Non Final Office Action for U.S. Appl. No. 11/010,200, Dated Apr. 8, 2008.

* cited by examiner

FAST CHANNEL CHANGE

TECHNICAL FIELD

This disclosure relates in general to changing channels in a digital video environment and in particular, by way of example but not limitation, to reducing the video presentation latency when changing from one video channel to another video channel in a digital multicast network.

BACKGROUND

Television-based entertainment systems are expanding the programming and services that they offer. In addition to television programming content such as that found on broadcast and traditional cable networks, television service providers are adding on-demand video, as well as other interactive services, features, and applications. The existence of these specific services, features, and applications, as well as the continuing increase in the breadth of available general programming content, drives the adoption of digital network technology for television-based entertainment systems.

Digital technology enables satellite and cable operators to increase the number and kinds of services that they offer to subscribers and thus their average revenue per subscriber. Unfortunately, although digital technology offers many advantages to subscribers as compared to traditional analog networks, it also has a number of drawbacks. For example, changing channels in a digital television service typically takes longer than in an analog television service. This channel changing latency annoys and frustrates users of the digital television service.

This channel changing latency and other drawbacks of digital technology lead to higher rates of subscriber churn, which means that a large percentage of subscribers that try digital television service switch back to traditional analog service within a short time period. Switching subscribers from analog to digital service involves expenditures for network operators that range from broad, general marketing costs down to individual incentives and installation expenses. Furthermore, network operators usually have greater opportunity and/or ability to sell add-on services (e.g., extra channels, pay-per-view, etc.) in conjunction with digital network services. Consequently, reducing subscriber churn can financially benefit satellite and cable operators.

Accordingly, for e.g. television-based entertainment systems, there is a need for schemes and/or techniques to reduce the churn out of digital service and back to traditional analog service that results from subscribers being dissatisfied with the slower channel changing experienced with digital television service.

SUMMARY

In an exemplary server implementation, a server is configured to retain at least one independent frame for each video channel of multiple video channels that are being distributed using multicast communications and is adapted to respond to channel change requests from clients by transmitting the retained at least one independent frame of a requested video channel to a requesting client using a unicast communication. In an exemplary method implementation, a method for fast channel changing in a multicast video distribution architecture includes: detecting a channel change request that indicates a requested channel, the requested channel corresponding to a multicast group; and transmitting a retained intra frame for the requested channel as a unicast communication.

Other method, system, approach, apparatus, server, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
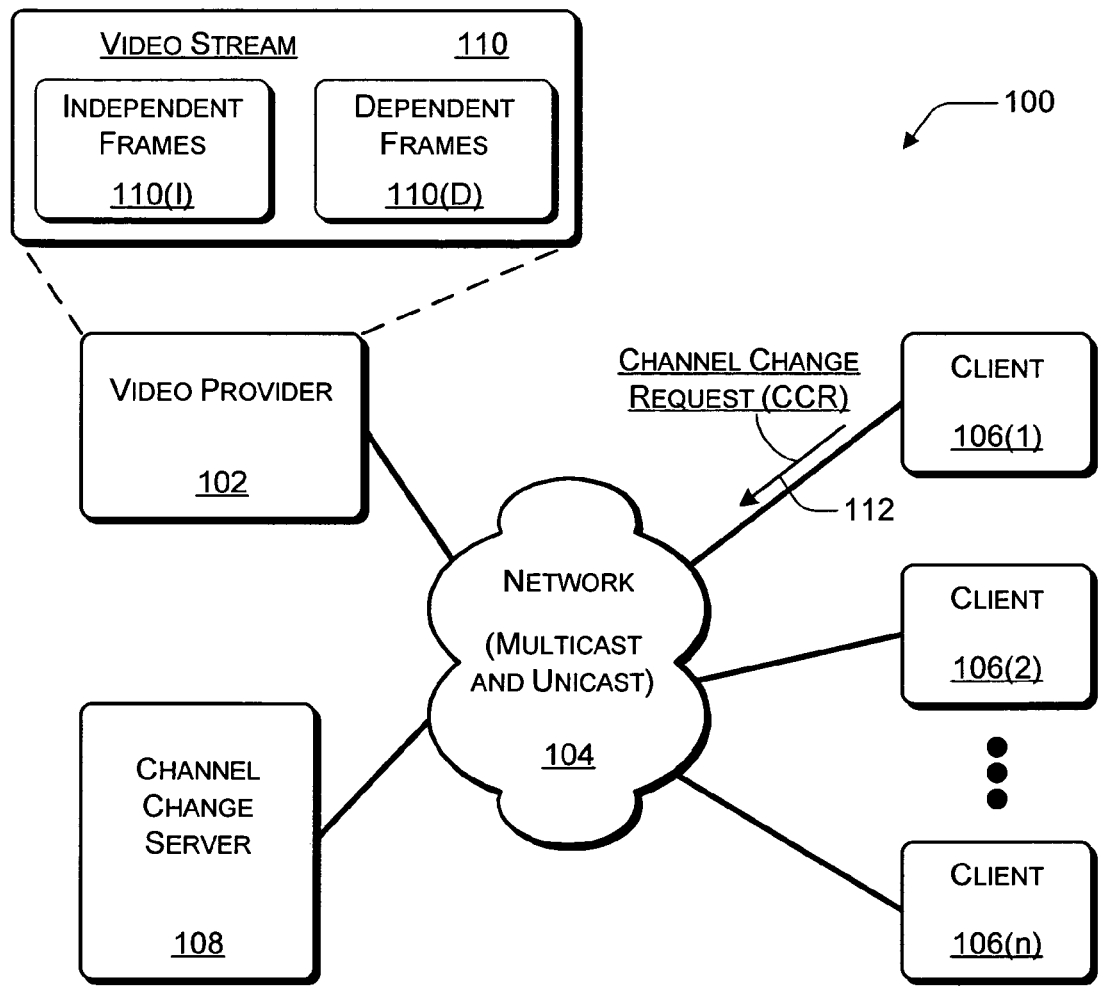
FIG. 1 illustrates an exemplary video distribution architecture that includes a network that is capable of both multicast and unicast communications.

FIG. 1 illustrates an exemplary video distribution architecture 100 that includes a network 104 that is capable of both multicast and unicast communications. Network 104 is implemented with multiple network elements (not separately shown in FIG. 1). Each network element may be capable of facilitating both multicast and unicast communications, or each network element may be capable of facilitating either multicast or unicast communications. Furthermore, network 104 may include some network elements that participate in both multicast and unicast communications and other network elements that participate in either multicast or unicast communications (but not necessarily both).

As illustrated, a video provider 102, a channel change server 108, and one or more clients 106(1), 106(2) ... 106(n) are coupled to network 104. Video provider 102 is capable of providing video for multiple channels to clients 106 utilizing a multicast scheme over network 104. Likewise, clients 106 are capable of receiving video for multiple channels from video provider 102 via a multicast scheme over network 104. Video as used herein may optionally include audio and/or associated audio/video presentation control information.

In a described implementation, video provider 102 receives, stores, and/or otherwise has access to video information for multiple channels as represented by the illustrated video stream 110 for a given particular channel. Each video stream 110 is comprised of independent frames 110(I) and dependent frames 110(D). Independent frames 110(I) may be decoded without reference to other video frames. Independent frames 110(I) include, for example, intra (I) frames. In contradistinction, dependent frames 110(D) are decoded with reference to one or more other video frames. Dependent frames 110(D) include, for example, predicted (P) frames and bidirectional (B) frames. Consequently, because independent frames 110(I) may be decoded without waiting for any subsequent frames, independent frames 110(I) may be decoded more quickly and/or sooner than dependent frames 110(D), at least for a video stream 110 that is being received in real-time.

Generally, video stream 110 is distributed from video provider 102 over network 104 to selected clients 106 using a multicast scheme. For example, video provider 102 may correspond to a multicast source, network 104 may include multiple multicast replication points, and clients 106 may correspond to multiple multicast receivers. Furthermore, each video stream 110 for a particular video channel may correspond to a multicast stream in a multicast video distribution scheme.

In operation, each given client 106 that requests to receive a particular video channel is joined to a multicast group corresponding to that particular video channel. Thereafter, network 104 forwards a duplicate of the associated video stream 110 for the particular video channel that corresponds to the multicast group to which the given client 106 has been joined. Network 104 forwards duplicates of video stream 110 to selected clients 106 via one or more replication points (not separately shown in FIG. 1).

When a given client 106 (e.g., client 106(1)) wishes to change channels, client 106(1) transmits a channel change request (CCR) 112 toward a video distribution headend or similar server or system. Channel change request 112 includes, in addition to an identifier of client 106(1), an indication of the requested video channel. As illustrated, video provider 102 and channel change server 108 separately or jointly comprise a video distribution headend. Channel change request 112 precipitates a multicast group change to a multicast group corresponding to the requested video channel.

After the multicast group change, video stream 110 can then be directed to the requesting client 106(1). However, a long channel changing latency may be experienced by the user of client 106(1) if client 106(1) begins receiving video stream 110 during a time period of dependent frames 110(D), which cannot be independently decoded. Client 106(1) waits to decode video until a next independent frame 110(I) is received by client 106(1).

In a described implementation, channel change server 108 responds to channel change request 112 to ameliorate this channel changing latency. Specifically, channel change server 108 is adapted to unicast an independent frame 110(I) for the requested video channel to client 106(1). More specifically, channel change server 108 is adapted to transmit a retained independent frame 110(I) for the video stream 110 that is associated with the requested video channel to client 106(1) in a unicast communication. This retained independent frame 110(I) may then be decoded (and displayed) relatively quickly without regard to other frames 110(I or D) and without having to wait for the next independent frame 110(I).

Channel change server 108 may operate in any one or more of three exemplary modes when unicasting a retained independent frame. In a first mode, a retained independent frame comprises a cached previous independent frame. This first mode is described further below with reference to FIG. 2. In a second mode, a retained independent frame comprises a cached previous (or possibly buffered) independent frame. This second mode is described further below with reference to FIG. 3A. In a third mode, a retained independent frame comprises a buffered independent frame. This third mode is described further below with reference to FIG. 3B. The second and third modes are implementations that can also involve synchronized joining of clients to a relevant multicast group.

Figure 2:
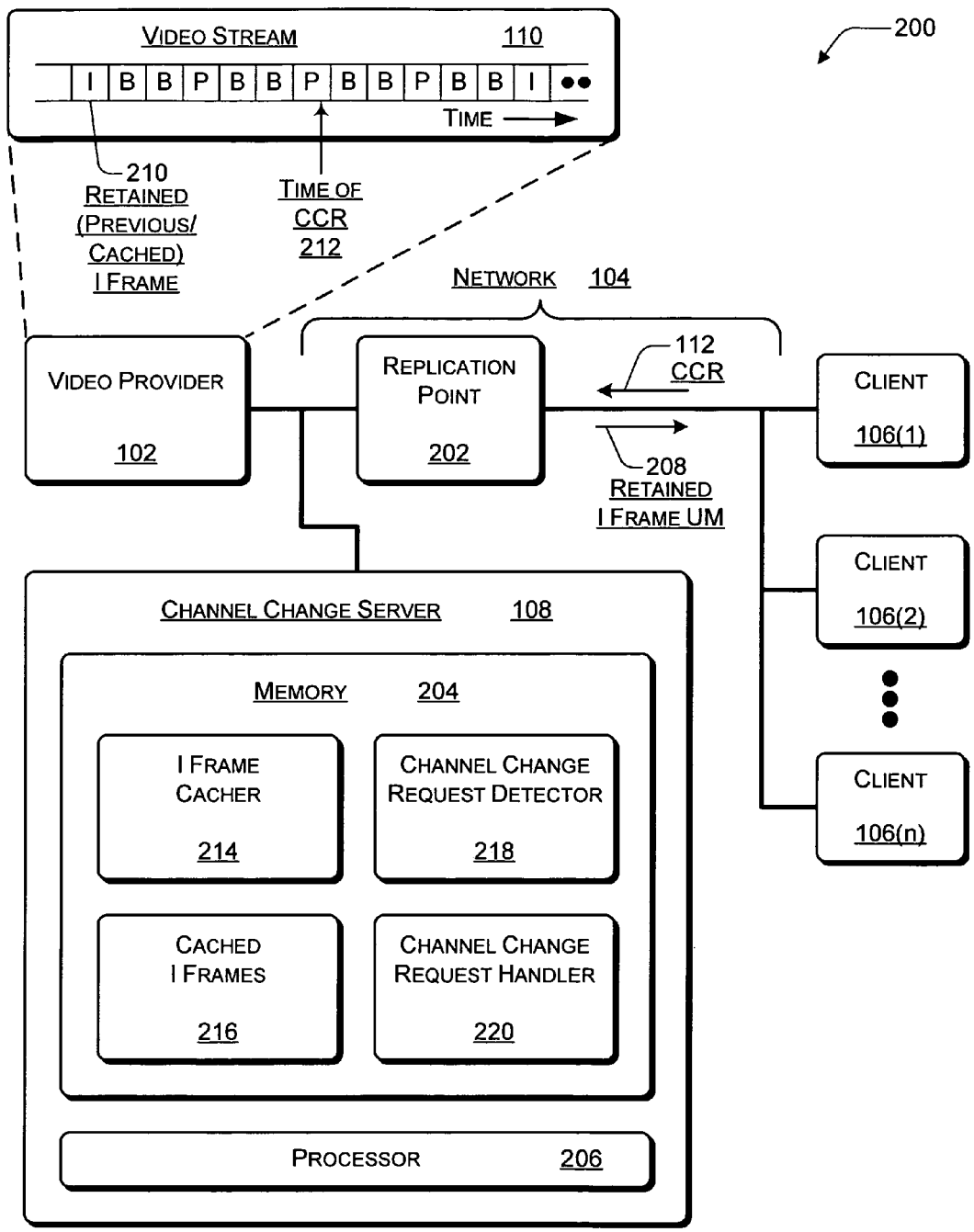
FIG. 2 illustrates a video distribution architecture that includes an exemplary channel change server that is capable of providing an intra frame in a unicast message.

FIG. 2 illustrates a video distribution architecture 200 that includes an exemplary channel change server 108 that is capable of providing an intra frame in a unicast message 208. With respect to video distribution architecture 100 (of FIG. 1), video provider 102, channel change server 108, and clients 106(1, 2 . . . n) remain connected to network 104. However, additional details regarding network 104 are provided.

As illustrated, network 104 includes at least one replication point 202. Network 104 usually includes many such replication points 202. In fact, multiple replication points 202 are typically located between a multicast source (e.g., video provider 102 and/or channel change server 108) and a multicast receiver (e.g., any client of clients 106). In other words, although only one replication point 202 is explicitly shown, video stream 110 may be communicated (e.g., forwarded and/or duplicated) by multiple replication points 202 between video provider 102 and clients 106.

In a described implementation, replication points 202 are realized as any of many different types of network elements or nodes. For example, replication points 202 may be routers, switches, and so forth. As multicast-capable nodes, replication points 202 are adapted to facilitate group membership, to duplicate/forward multicast communications, to handle multicast streams as identified by source and group address (S,G), to perform other multicast-related functions, some combination or subset thereof, and so forth. For example, replication points 202 may be capable of implementing communications in accordance with a multicast routing protocol (e.g., protocol independent multicast-sparse mode (PIM-SM)), in accordance with a group management protocol (e.g., internet group management protocol (IGMP)), and so forth.

IGMP is used by receiver hosts (e.g., at least clients 106) and replication points 202 to notify each other about conditions and changes to group membership. PIM-SM is used to propagate forwarding state information between and among replication points 202. IGMP defines messages that are used to join clients 106 to a group and to notify replication points 202 that a client 106 is leaving a group. Although an implementation is described primarily in the context of IGMP, other multicast protocols may alternatively be employed.

Video stream 110 is illustrated as an exemplary stream of I, P, and B frames. Video stream 110 may be coded using any video compression algorithm or technology, such as the Moving Pictures Expert Group $4^{th}$ standard (MPEG-4: ISO/IEC 14496-1/2/3). The video frame series shown in FIG. 2 is "IBBPBBPBBPBBPBBI"; however, any video frame series may be present. In fact, the frame series for video stream 110 may be changing in an unknown and/or unpredictable fashion.

Channel change server 108 includes one or more processors 206 and at least one memory 204. Memory 204 includes processor-executable instructions that may be executed by processor 206 to perform function(s) as described further below. These processor-executable instructions may comprise hardware, firmware, software, some combination thereof, and so forth. Modules having processor-executable instructions that are stored as part of memory 204 include: I frame cacher 214, cached I frames 216, channel change request detector 218, and channel change request handler 220. These modules are described further herein below.

As noted generally above with reference to video stream 110, I frames can be independently decoded, but P and B frames usually cannot. P frames reference up to one other frame, and B frames reference up to two other frames. When a particular client 106 joins a new multicast group corresponding to a different video channel, the particular client 106 is unable to begin decoding video stream 110 (or display any video for the user) until an I frame is received. Under an MPEG-4 video coding paradigm, the average delay between a channel change request 112 and receipt of an I frame during normal stream flow can be 1-2 seconds. This delay can lengthen to 5-10 seconds with next generation coding paradigms. Channel change server 108 can reduce this average delay and thereby ameliorate user frustrations arising from long channel changing delays.

In a described implementation, client 106(1) initially determines that a video channel change is desired (e.g., as a result of user input) and/or being demanded. Client 106(1) formulates a channel change request 112 that indicates a requested channel and identifies (perhaps implicitly) client 106(1). Channel change request 112 is transmitted upstream (e.g., as a unicast message) through one or more replication points 202.

Channel change request detector 218 configures channel change server 108 to be monitoring network 104 for channel change requests 112. When channel change request 112 from client 106(1) is detected, channel change request handler 220 is activated to respond to it. Specifically, channel change request handler 220 responds by sending a previous I frame for the requested channel to client 106(1) in a unicast message.

In order to be able to send previous I frames for requested channels to clients 106, channel change server 108 secures access to such previous I frames by retaining them at least temporarily. Specifically, I frame cacher 214 tracks each video stream 110 that is associated with each video channel and stores at least the immediately most recent previous I frame for each video stream 110. These most recent previous I frames are stored as cached I frames 216.

As illustrated in FIG. 2, the activation time of channel change request 112 is indicated along video stream 110 as time of CCR 212. This time of CCR 212 falls between two I frames. Hence, retained I frame 210, which comprises a cached or previous I frame in this mode, has already been stored at cached I frames 216 by I frame cacher 214. Channel change request handler 220 extracts retained I frame 210 from cached I frames 216. Channel change request handler 220 also formulates a unicast message (UM) that includes retained I frame 210 and transmits it as retained I frame UM 208 toward client 106(1).

Client 106(1) receives retained I frame UM 208 and can decode and display retained I frame 210 thereof while awaiting the next I frame of video stream 110 that is associated with the requested channel. The faster that retained I frame UM 208 is received by client 106(1), the shorter the delay between when a user requests a channel change and when a full (initially static) video frame is displayed and the less likely that transmission of retained I frame 210 in retained I frame UM 208 is to interfere with the reception of current and possibly more-relevant (e.g., newer) frames of video stream 110. Hence, transmission bandwidth at least between client 106(1) and the replication point 202 that is most proximate thereto can be an issue. Addressing this transmission bandwidth issue is described below with reference to FIGS. 3A and 3B.

Figure 3A:
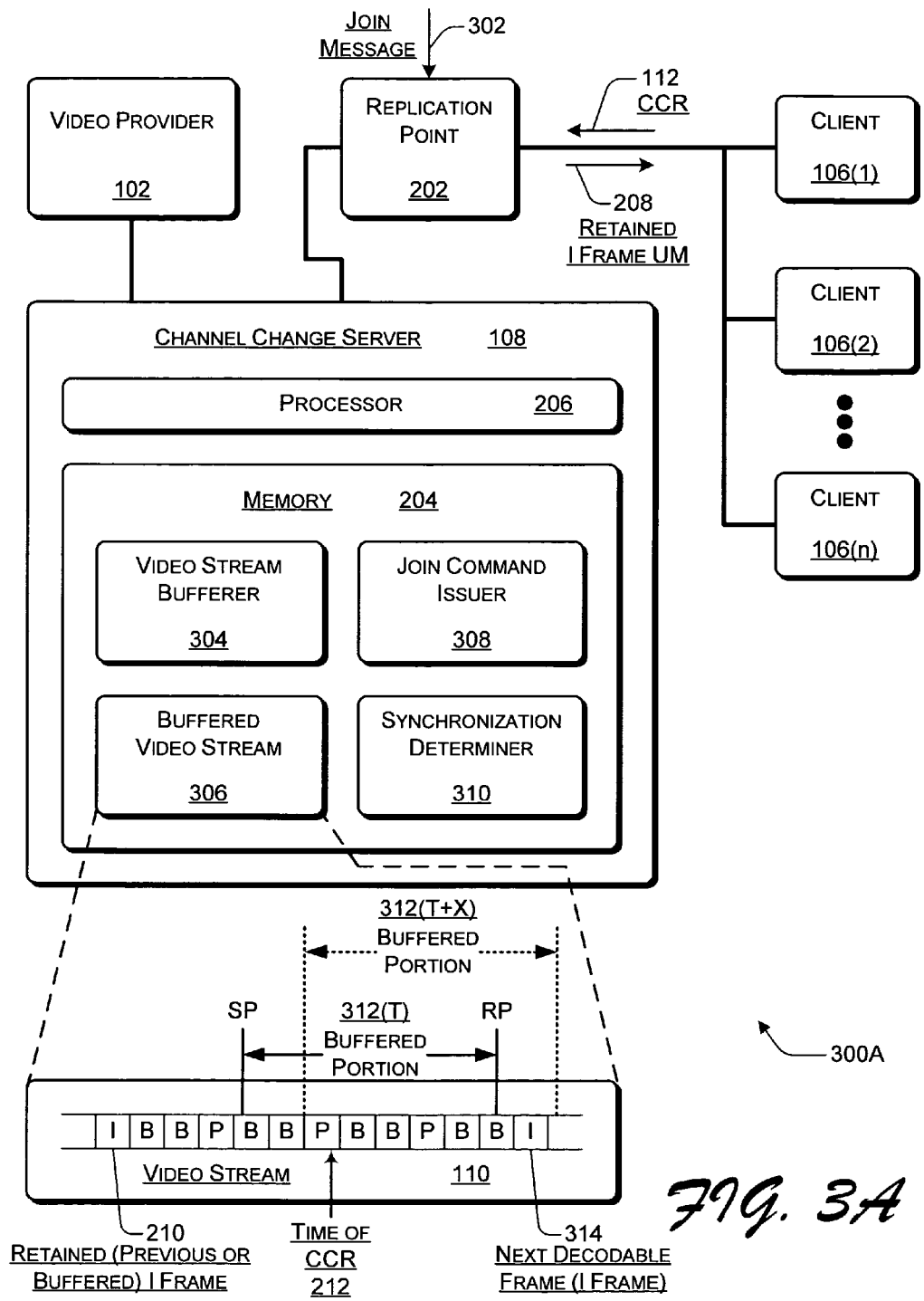
FIG. 3A illustrates a video distribution architecture that includes an exemplary channel change server that is capable of synchronizing a joining to a multicast group for a client using a join command.

FIG. 3A illustrates a video distribution architecture 300A that includes an exemplary channel change server 108 that is capable of synchronizing a joining to a multicast group for client 106(1) using a join command. With respect to video distribution architecture 200 (of FIG. 2), video provider 102, channel change server 108, and clients 106(1, 2 ... n) remain connected to network 104. However, video provider 102 provides video streams 110 via channel change server 108. Although shown separately, video provider 102 and channel change server 108 (e.g., in FIGS. 1-3B) may be co-located and/or combined into a single server or system.

In a described implementation, channel change server 108 is adapted to buffer video stream 110 to delay it in time before multicast streaming distribution thereof. Channel change server 108 is capable of synchronizing a joining to a new channel to just prior to a new I frame for a video stream 110 that is associated with the new channel by "predicting" the occurrence of a next I frame. This quasi-prediction is accomplished using the time delay aspect of the buffered portion of video stream 110.

As illustrated, channel change server 108 includes memory 204 that has processor-executable instructions, which may be executed by processor 206 to perform function(s) as described further below. Modules having processor-executable instructions that are stored as part of memory 204 include: video stream bufferer 304, buffered video stream 306, join command issuer 308, and synchronization determiner 310. The functions of modules 304, 306, 308, and 310 may be implemented in conjunction with or separately from those of modules 214, 216, 218, and 220 (of FIG. 2).

Channel change server 108 accepts video stream 110 (for each video channel) from video provider 102. Video stream bufferer 304 creates a buffered portion 312(T) of video stream 110 between a receive point (RP) and a send point (SP). Each currently-buffered buffered portion 312 is stored as buffered video stream 306. Buffered portion 312(T) corresponds to a current time "T". The receive point corresponds to the point along video stream 110 at which channel change server 108 is currently receiving from video provider 102. The send point corresponds to the point along video stream 110 at which channel change server 108 is currently sending toward clients 106.

In a described implementation, client 106(1) transmits upstream (e.g., as a unicast message) channel change request 112, possibly through one or more replication points 202 depending on the upstream path. The activation time of CCR 212 is indicated with respect to video stream 110 and buffered portion 312(T). Retained I frame 210 may be sent in retained I frame UM 208 by channel change request handler 220 (as described above with reference to FIG. 2). In this mode, retained I frame 210 comprises a cached or buffered I frame. If the retained I frame 210 happens to be within buffered portion 312(T), it may be retrieved directly from buffered video stream 306, possibly even prior to being cached as part of cached I frames 216 if I frames are not cached until they are sent at the send point SP.

Because full decoding of true motion video does not start until reception of the next upcoming I frame, transmission of intervening P and/or B frames can be considered unnecessary bandwidth usage. To avoid such bandwidth squandering and to increase the likely speed at which retained I frame UM 208 is received by client 106(1), synchronization determiner 310 is capable of causing client 106(1) to be joined to the multicast group corresponding to the requested channel just in time to receive the next decodable frame. This may, for example, amount to as little "excess bandwidth" utilization as a few packets before the next I frame to as much "excess bandwidth" as multiple frames. In this mode, the next decodable frame comprises another I frame.

Specifically, synchronization determiner 310 ascertains whether the next I frame is present within the current buffered portion 312 of video stream 110. At time of CCR 212, the next decodable frame 314 is not within buffered portion 312(T). However, after "X" unit(s) of time, the next decodable frame 314 is within buffered portion 312(T+X). When synchronization determiner 310 ascertains that the next decodable frame 314 is within the current buffered portion 312, synchronization determiner 310 determines that it is time to issue a join command and thus activates or prompts join command issuer 308.

Join command issuer 308, once activated, issues a join command over network 104 (not explicitly indicated in FIG. 3A for clarity). The join command causes a join message 302 to be received at replication point 202. Join message 302 notifies replication point 202 that client 106(1) is to begin receiving the multicast stream that corresponds to the requested channel by joining client 106(1) to the multicast group for that multicast stream. This join message 302 may be transmitted from client 106(1) or join command issuer 308 of channel change server 108. The former is described further below with reference to FIG. 4A, and the latter is described further below with reference to FIG. 4B. In the latter implementation, the join command that is issued by join command issuer 308 may comprise join message 302.

In a described implementation, the size of buffered portion 312 relates to an expected (including a known) time that is consumed when joining a client 106 to a multicast group of a multicast channel. This time may include a time period to effectuate a leave operation. By way of example, buffered portion 312 may correspond to a worst case (e.g., absolute or reasonable worst case) scenario for effectuating a join operation for any of the relevant clients 106. Alternatively, the size of buffered portion 312 may correspond to an average time to effectuate a multicast join operation, may be tailored for each individual or designated set of clients 106 if conditions of network 104 vary spatially or temporally, and so forth.

Figure 3B:
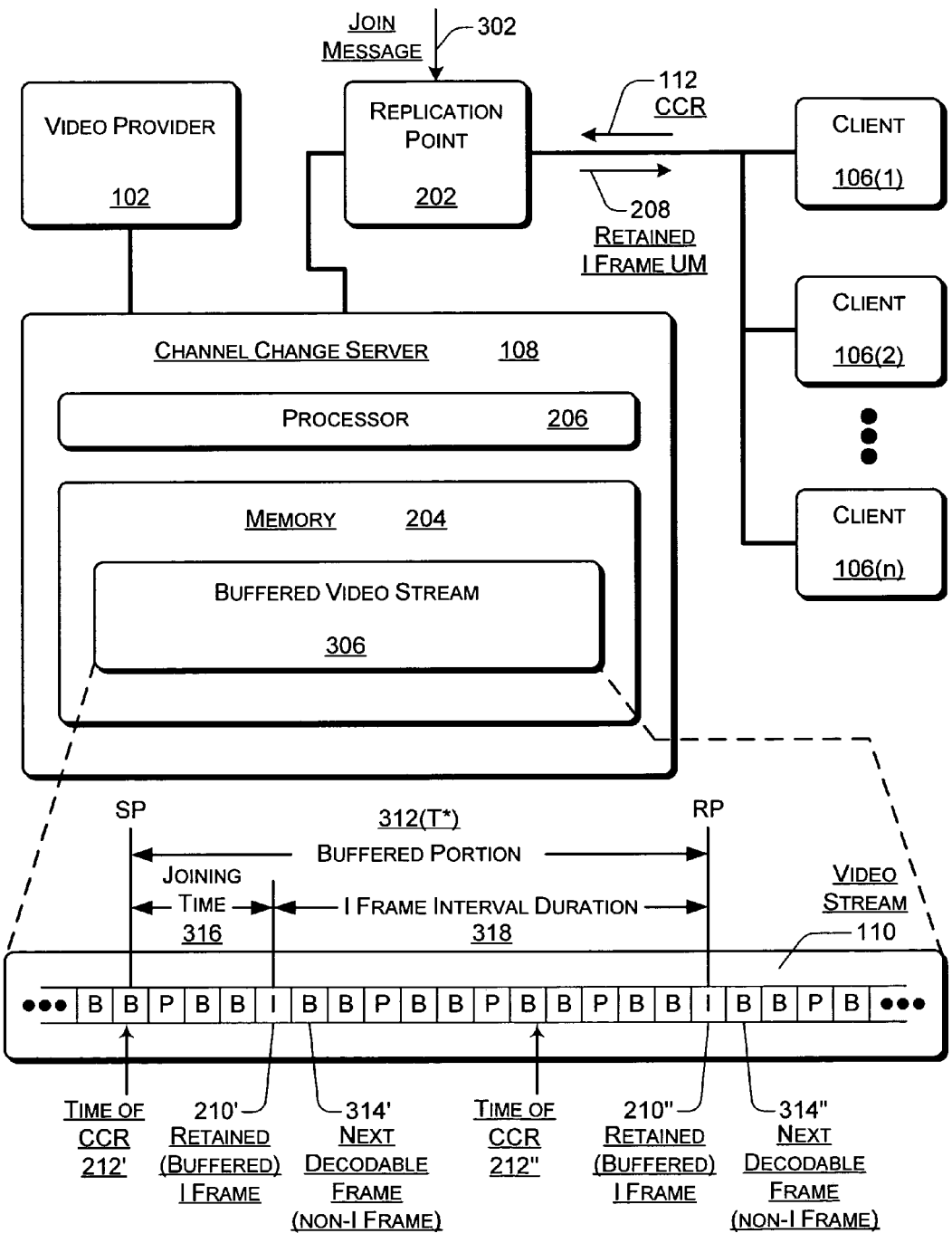
FIG. 3B illustrates a video distribution architecture that includes an exemplary channel change server that is capable of synchronizing a joining to a multicast group for a client using a join command and that is capable of providing a smoother initial video presentation experience.

FIG. 3B illustrates a video distribution architecture 300B that includes an exemplary channel change server 108 that is capable of synchronizing a joining to a multicast group for client 106(1) using a join command and that is capable of providing a smoother initial video presentation experience. Video distribution architecture 300A can result in a video gap or discontinuity that is experienced by a user of a client 106. This video gap/discontinuity results from the consecutive display of two non-consecutive I frames, which have multiple intervening undisplayed non-I frames. Video distribution architecture 300B ameliorates this video gap/discontinuity by smoothing the video presentation as described below.

For the sake of clarity, video stream bufferer 304, join command issuer 308, and synchronization determiner 310 are not shown in FIG. 3B. However, a longer segment of video stream 110 is illustrated. Buffered portion 312(T*) is longer than buffered portion 312(T) (of FIG. 3A). Buffered portion 312(T*) includes a joining time 316 and an I frame interval duration 318, as described below.

In a described implementation for this third mode, channel change server 108 is adapted to buffer video stream 110 to delay it in time, before multicast streaming distribution thereof, by at least the maximum distance between I frames plus the maximum join-time for client 106(1) to become joined to the multicast group corresponding to the requested channel. Channel change server 108 is capable of synchronizing a joining to a new channel to just after a new I frame for a video stream 110 that is associated with the new channel by "predicting" the occurrences of I frames. This quasi-prediction is accomplished using the time delay aspect of the buffered portion 312(T*) (e.g., the delay window) of video stream 110.

Channel change server 108 is adapted to retain I frames within buffered portion 312(T*). The retained I frames may be retained by I frame cacher 214 as cached I frames 216 or as recorded pointers/indexes to I frames that are in the buffered window. Alternatively, the retained I frames may be retained within buffered portion 312(T*) without using an I frame cacher 214. In a described implementation for this mode, retained I frame 210 comprises a buffered I frame.

When client 106(1) requests a channel change via a CCR 112, channel change server 108 provides the oldest retained I frame 210 within the delay window of buffered portion 312 (T*) for which client 106(1) still has time to receive a retained I frame UM 208 and to join the multicast group in time to receive the frame immediately subsequent to the oldest retained I frame 210. In this manner, client 106(1) receives a contiguous set of frames, with the first frame being a retained I frame 210 arriving via a retained I frame UM 208 and the (initial) subsequent frames being non-I frames arriving via the multicast group. Client 106(1) pauses on the retained I frame 210 because it is sent "ahead of time", and client 106(1) then begins full motion video when it is time to play the immediately subsequent frame that is obtained from the delayed multicast stream.

Joining time 316 corresponds to the time consumed when joining a client 106 to a multicast group, as described above with reference to FIG. 3A. I frame interval duration 318 corresponds to the greatest possible time period between successive I frames for the given coding scheme. As illustrated, a first time of CCR 212' is shown arriving just as joining time 316 is about to start. Consequently, a first retained I frame 210', which is a buffered I frame in this implementation of the third mode, and a first next decodable frame 314' are the first two frames that a client 106 receives to start video decoding. A second time of CCR 212" is shown arriving after expiration of joining time 316 with respect to retained I frame 210' but prior to expiration of a joining time 316 (not explicitly shown) with respect to retained I frame 210". Consequently, a second retained I frame 210", and a second next decodable frame 314" are the first two frames that a client 106 receives to start video decoding for second time of CCR 212".

Figure 4A:
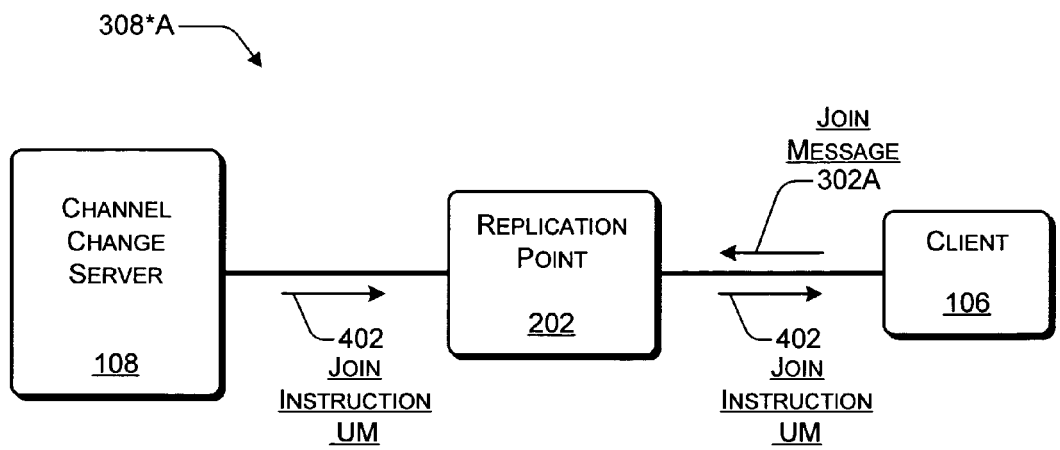
FIG. 4A illustrates a first exemplary mechanism for implementing a join command.

FIG. 4A illustrates a first exemplary mechanism 308*A for implementing a join command. Exemplary mechanism 308*A involves participation by client 106 as well as channel change server 108 and replication point 202. Specifically, channel change server 108 transmits a join instruction UM 402 to client 106 via replication point 202. Join instruction UM 402 stipulates to client 106 when to transmit its join message responsive to the determination made by synchronization determiner 310 (of FIGS. 3A and 3B) of channel change server 108. At the appointed stipulated time, client 106 transmits join message 302A to replication point 202 so that client 106 is joined to the multicast group corresponding to the requested channel in time to receive the next decodable frame 314 and without receiving a significant amount of earlier non-I (or inter) frame(s) or otherwise non-decodable frame(s).

This joining delay of the multicast stream facilitates bandwidth availability for the unicast delivery of retained I frame 210 (of FIGS. 2, 3A, and 3B). Replication point 202 may be, for example, the replication point 202 that is closest to client 106 and capable of multicasting the desired video stream 110.

To the extent that the join operation is precipitated by a join message 302A that is transmitted from client 106, exemplary mechanism 308*A comports with a more-typical multicast joining procedure. However, the logistics involved are non-trivial inasmuch as three network elements are involved in the instigation of the join message and because setting time constraints (e.g., as reflected by the size of buffered portion 312) becomes concomitantly more difficult and/or more extreme for worst case analysis. The joining procedure can be simpler and more certain if client 106 is not obligated to participate.

Figure 4B:
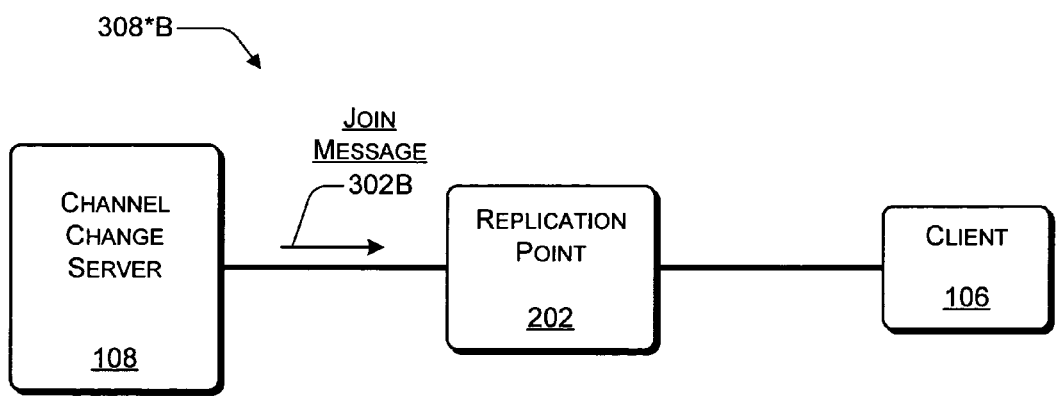
FIG. 4B illustrates a second exemplary mechanism for implementing a join command.

FIG. 4B illustrates a second exemplary mechanism 308*B for implementing a join command. Exemplary mechanism 308*B involves participation by channel change server 108 and replication point 202. Specifically, channel change server 108 transmits a join message 302B to replication point 202. Join message 302B is transmitted responsive to the determination made by synchronization determiner 310 and likely involves less lead time for effectuating the joining operation with sufficient clearance to receive the next decodable frame 314. Join message 302B notifies replication point 202 that client 106 is to be joined to the multicast group corresponding to the requested channel. Exemplary mechanism 308*B entails enabling non-receiver hosts, such as sender/source hosts, to be capable of precipitating join operations on behalf of receiver hosts.

Figure 5:
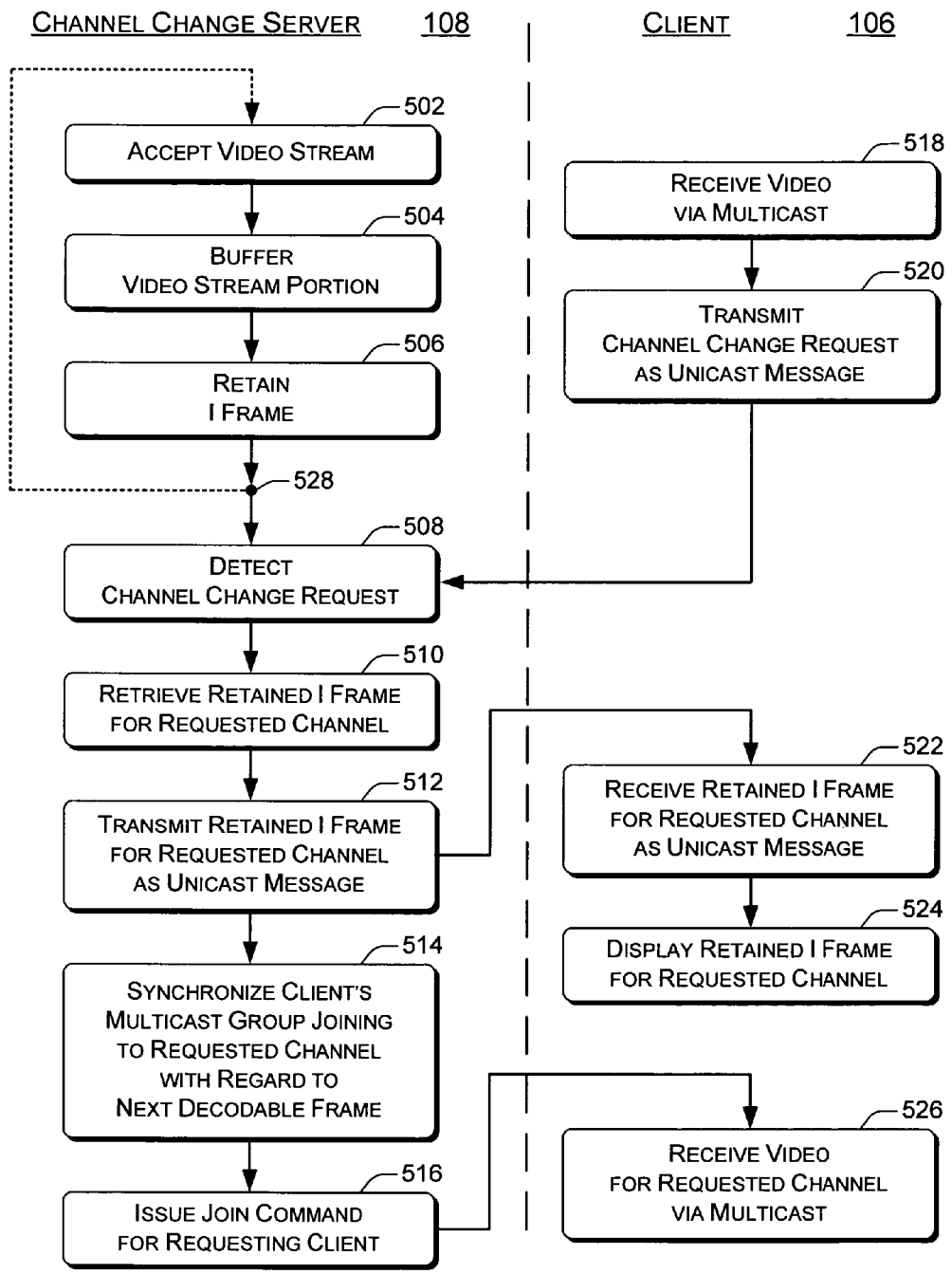
FIG. 5 is a flow diagram that illustrates an exemplary method for fast channel changing with a combination multicast and unicast network.

FIG. 5 is a flow diagram 500 that illustrates an exemplary method for fast channel changing with a combination multicast and unicast network. Flow diagram 500 includes thirteen (13) blocks 502-526. Although the actions of flow diagram 500 may be performed in other environments and with a variety of e.g. software schemes, FIGS. 2, 3A-3B, and 4A-4B are used in particular to illustrate certain aspects and examples of the method.

For example, the actions of blocks 502-526 may be performed by a channel change server 108 and a client 106, possibly in conjunction with one or more replication points 202 of a network 104. As illustrated, channel change server 108 performs the actions of blocks 502-516, and client 106 performs the actions of blocks 518-526.

At block 502, a video stream is accepted. For example, channel change server 108 may accept one or more video streams 110 from an associated video provider 102. At block 504, a portion of the accepted video stream is buffered. For example, video stream bufferer 304 may delay each video stream 110 that is associated with each channel to create buffered portion 312 for each video stream 110. The buffered portions 312 may be stored as a set of buffered video streams 306 with frames that enter at the receiving point (RP) and "move" toward the sending point (SP).

At block 506, at least one I frame is retained. For example, I frame cacher 214 of channel change server 108 may retain the retained frame (e.g., retained I frame 210) of each video stream 110 that is associated with each channel as a set of cached I frames 216 or a set of indexes/pointers to frames in a buffered portion 312(T*). Alternatively, I frames may be retained by being buffered at known or determinable locations of buffered portion 312(T*). As indicated by the dashed arrow that diverges from point 528, the actions of blocks 502-506 are ongoing for channel change server 108.

At block 518, video is being received via multicast communication. For example, client 106 may be receiving video stream 110 from video provider 102 and/or channel change server 108 as a multicast stream over one or more replication points 202 of network 104. At block 520, a channel change request is transmitted as a unicast message. For example, client 106 may transmit a channel change request 112 as a unicast message toward channel change server 108. This channel change request 112 is effectively a request to switch from a first multicast group corresponding to a first video channel to a second multicast group corresponding to a second video channel, with the requested second video channel being indicated by channel change request 112.

At block 508, a channel change request is detected. For example, channel change request detector 218 of channel change server 108 may detect channel change request 112. If video distribution architecture 200 is implemented, channel change server 108 may be monitoring links of and/or interfaces to network 104 in the vicinity of video provider 102 for channel change requests 112, or video provider 102 may be forwarding channel change requests 112 (or channel change server 108 may be the intended recipient of channel change requests 112). If video distribution architecture 300A or 300B is implemented, channel change server 108 may be the intended recipient of channel change requests 112, and so forth.

At block 510, a retained I frame for the requested channel is retrieved. For example, channel change request handler 220 accesses cached I frames 216 and/or buffered portion 312(T*) of buffered video stream 306 to retrieve the retained I frame (e.g., retained I frame 210, including 210' and 210") for the video stream 110 associated with the requested channel. At block 512, the retained I frame for the requested channel is transmitted as a unicast message. For example, channel change request handler 220, after appropriate formulation, transmits retained I frame UM 208 toward client 106.

At block 522, the retained I frame for the requested channel is received as a unicast message. For example, client 106 may receive retained I frame UM 208, which is an example of a unicast communication, even though client 106 usually receives video streams 110 as multicast streams during standard video channel reception. At block 524, the retained I frame for the requested channel is displayed. For example, client 106 extracts the retained I frame for the requested channel from the retained I frame UM 208 and causes the retained I frame to be displayed. Depending on the time period until the next decodable frame 314 (including 314' and 314") is due, this static I frame presentation may continue for a noticeable time (e.g., up to 1-2 seconds in a typical MPEG-4 video coding implementation).

At block 514, the client's joining to the multicast group that corresponds to the requested channel is synchronized with regard to the next decodable frame. For example, for video distribution architectures 300A and 300B, synchronization determiner 310 of channel change server 108 may ascertain when the next decodable frame 314 is due to be sent to (and thereby when next decodable frame 314 is likely to be received or will be received in a worst-case scenario by) client 106. This next decodable frame 314 ascertainment may be performed with reference to buffered portion 312 (including buffered portion 312(T*) and joining time 316 thereof) for the video stream 110 that is associated with the requested channel. Once the timing of next decodable frame 314 is ascertained, synchronization determiner 310 determines the appropriate timing for the multicast joining operation of client 106 to the multicast group corresponding to the requested channel.

At block 516, a join command is issued for the requesting client. For example, join command issuer 308 may issue a join command with respect to client 106 responsive to a synchronization determination by synchronization determiner 310. The join command may comprise a join instruction unicast message 402 that is sent to client 106 to prompt client 106 to transmit a join message 302A at an appointed time to a replication point 202 (e.g., exemplary mechanism 308*A for implementing a join command). Alternatively, the join command may comprise a join message 302B that is sent "directly" to a replication point 202 on behalf of client 106 (e.g., exemplary mechanism 308*B for implementing a join command).

At block 526, video for the requested channel is received via multicast communication. For example, client 106 may receive video stream 110 that is associated with the requested channel via a corresponding multicast streaming group over network 104 using multiple replication points 202. In other words, after a replication point 202 has caused client 106 to be joined to the corresponding multicast streaming group responsive to a join message 302, at least that one replication point 202 duplicates (as necessary) and forwards video stream 110 to client 106.

The actions of blocks 512 and 516 may, in particular, be performed in a myriad of orders. For example, the issuance of block 516 may occur after the transmission of block 512, or the issuance and transmission of blocks 516 and 512 may occur substantially simultaneously or at least without consideration of the order of either. Alternatively, the issuance of block 516 may be performed after the transmission of block 512 unless a next I frame is of such temporal proximity (e.g., closer than a predetermined threshold period) that waiting to issue the join command jeopardizes the ability of a channel changing client to receive the next I frame.

The actions, aspects, features, components, etc. of FIGS. 1-5 are illustrated in diagrams that are divided into multiple blocks. However, the order, interconnections, layout, etc. in which FIGS. 1-5 are described and/or shown is not intended to be construed as a limitation, and any number of the blocks can be combined, rearranged, augmented, omitted, etc. in any manner to implement one or more systems, methods, devices, procedures, media, apparatuses, servers, arrangements, etc. for fast channel changing. Furthermore, although the description herein includes references to specific implementations, the illustrated and/or described implementations can be implemented in any suitable hardware, software, firmware, or combination thereof and using any suitable video distribution architecture(s), network element(s) and organization(s), video encoding standard(s), multicast and unicast scheme(s), and so forth.

With particular reference to FIGS. 2 and 3A-3B, a video provider 102 and/or a server 108 may include a variety of processor-accessible media. Such media may be any available media that is accessible by a computing or other (e.g., electronic) device. Such media may include both volatile and non-volatile media, removable and non-removable media, and storage (e.g., memory 204) and transmission media (e.g., links or nodes of network 104). The media may include processor-executable instructions.

Implementations for fast channel changing may be described in the general context of processor-executable instructions. Generally, processor-executable instructions include routines, programs, protocols, objects, interfaces, components, data structures, etc. that perform and/or enable particular tasks and/or implement particular abstract data types. Fast channel changing, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A method for fast channel changing in a multicast video distribution architecture, the method comprising:
   buffering a multicast video stream segment at a server, the buffered multicast video stream segment including a first retained intra frame and a second retained intra frame, the first retained intra frame being before the second retained intra frame in the buffered multicast video stream segment;
   detecting a channel change request that indicates a requested channel, the channel change request being from a requesting device, the requested channel corresponding to the buffered multicast video stream segment;
   determining whether a first next decodable non-intra frame after the first retained intra frame is at least a joining time after a send point of the buffered multicast video stream segment;
   in response to detecting the channel change request, transmitting to the requesting device a retained intra frame and no dependent frames for the requested channel as a unicast communication for static display, wherein,
   if the first next decodable non-intra frame after the first retained intra frame is at least the joining time after the send point of the buffered multicast video stream segment, the transmitted retained intra frame is the first retained intra frame and the first next decodable non-intra frame after the first retained intra frame is a joining frame, and wherein
   if the first next decodable non-intra frame after the first retained intra frame is less than the joining time after the send point of the buffered multicast video stream segment, the transmitted retained intra frame is the second retained intra frame and a second next decodable non-intra frame after the second retained intra frame is the joining frame; and
   synchronizing a multicast joining operation to a multicast group corresponding to the requested channel, wherein synchronizing includes ensuring the joining frame is the oldest non-intra frame of the buffered multicast video stream segment received by the requesting device in response to the channel change request a first multicast frame after the multicast joining operation is the joining.

2. The method as recited in claim 1, further comprising:
   caching at least one previous intra frame for each channel of a plurality of channels as a set of cached intra frames; and
   retrieving, responsive to the detecting, the retained intra frame for the requested channel from the set of cached intra frames, the retained intra frame comprising a previous intra frame.

3. The method as recited in claim 1, wherein:
   the detecting comprises detecting the channel change request from a particular client; and
   the transmitting comprises transmitting the retained intra frame to the particular client.

4. The method as recited in claim 1, further comprising:
   wherein the joining comprises determining when the retained intra frame reaches a joining time of the buffered video stream portion.

5. A method for fast channel changing in a multicast video distribution architecture, the method comprising:
   sending a channel change request to a server, the channel change request indicating a requested channel, the server buffering a multicast video stream segment, the buffered multicast video stream segment including a first retained intra frame and a second retained intra frame, the first retained intra frame being before the second retained intra frame in the buffered multicast video stream segment, the requested channel corresponding to a multicast group and the buffered multicast video stream segment corresponding to the requested channel, wherein the server determines whether a first next decodable non-intra frame after the first retained intra frame is at least a joining time after a send point of the buffered multicast video stream segment;

in response to sending the channel change request, receiving a retained intra frame for the requested channel as a unicast communication, wherein if the first next decodable non-intra frame after the first retained intra frame is at least the joining time after the send point of the buffered multicast video stream segment, the transmitted retained intra frame is the first retained intra frame and the first next decodable non-intra frame after the first retained intra frame is a jointing frame, and wherein if the first next decodable non-intra frame after the first retained intra frame is less than the joining time after the send point of the buffered multicast video stream segment, the transmitted retained intra frame is the second retained intra frame and a second next decodable non-intra frame after the second retained intra frame is the joining frame;

statically displaying the received retained intra frame;

receiving as a multicast communication a portion of the multicast video stream corresponding to the requested channel, wherein the initial multicast frame of the multicast video stream received is the joining frame, the portion including a plurality of consecutive multicast frames of the multicast video stream; and switching from statically displaying the received retained intra frame to displaying the portion of the multicast video stream.

* * * * *